Jan. 7, 1964 J. T. MULLIN 3,117,262

PLURAL MOTOR TENSION BRAKING CONTROL SYSTEM

Filed Jan. 12, 1962

INVENTOR
John T. Mullin

By Smyth, Roston & Pavitt
Attorneys

United States Patent Office 3,117,262

Patented Jan. 7, 1964

3,117,262

PLURAL MOTOR TENSION AND BRAKING CONTROL SYSTEM

John T. Mullin, Beverly Hills, Calif., assignor to Minnesota Mining and Manufacturing Company, St. Paul, Minn., a corporation of Delaware Filed Jan. 12, 1962, Ser. No. 165,827

10 Claims. (Cl. 318—7)

This invention relates to an electrical system for controlling the movement of an information medium such as a magnetic tape. The invention also relates to a system for instantaneously stopping a medium such as a tape. The invention further relates to a relatively simple system for regulating the speed of a tape at a particular value.

In recent years, information has been recorded on a tape for storage and for subsequent reproduction from the tape. For example, video and audio information has been recorded for commercial and for home use. Also, information such as digital data obtained from computers and other scientific instruments has been recorded on the tape for subsequent use.

In order to accurately record information on the medium such as tape and accurately reproduce information from the tape, the speed at which the tape moves must be kept substantially constant. Furthermore, when the tape is being edited, it should be stopped instantaneously in order that the desired position can be edited properly. Editing occurs when the tape has video and audio information since it may be desired to change the information on the tape at isolated positions. Editing also occurs when the tape has digital data since the digital data has to be constantly made current on the basis of new information.

The regulation of the tape movement has been accomplished in the past by using a first motor to drive a take-up reel receiving the tape, and by using a second motor to drive a pay-out reel from which the tape is unwound. The second motor is energized in an opposite direction from the first motor to oppose the force exerted by the first motor. The first motor exerts a greater force than the second motor and overcomes the effect of the second motor so that the tape moves in the same direction as the rotation of the first motor. The second motor provides a force to maintain tension on the tape medium. This eliminates slack in the tape which prevents misrecording of information on the tape or breakage of the tape.

There are many problems connected with stopping the movement of tape and regulating the speed of the tape. For example, when it is desired to stop the movement of the tape, a loop of tape unwinds from the pay-out reel if the motor connected to the take-up reel comes to a stop before the other motor. This may cause a possible breakage of tape when the tape system is restarted, since the free loop of tape will become suddenly tensioned at the instant that the slack in the tape is eliminated by the rotation of the first and second motors in the opposite directions.

There are also many variable factors which cause the tape speed to change from a particular value at different instants of time. One significant factor is that the amount of tape on the tape reels varies continuously during recording or reproduction. Therefore, during each revolution of a tape reel a different amount of tape is wound or unwound. Because of this, the speed of the first and second motors should vary continuously to compensate for the differing amounts of tape being moved past the transducer heads at successive instants of time.

The above problems have created a need for a regulating system which is accurate, simple and fast acting. The prior art in responding to this need has developed fairly successful systems but has not been able to completely solve the problem. For example, the prior art has utilized systems to stop the motion of the tape by stopping both motors. This requires that both motors have very similar characteristics so that they stop in the same period of time. As discussed above, this is important to prevent loose tape from being unwound from the pay-out reel.

In regulating the speed of the tape, the prior art has used relatively complicated systems to compensate for the differing amounts of tape unwound from the tape reel for differing amounts of tape on the tape reel. Since the systems have been complicated, they have not been completely fast acting and accurate.

This invention utilizes conditions already present in the tape system to regulate the speed of the tape medium. The varying load on the motor from the differing amounts of tape on the tape reel causes the speed of the motor to be regulated so that the tape has a substantially constant speed. This is accomplished by changing a source of a constant voltage to the motor to a source of constant current. Since the current supply is constant, the speed of the motor varies in accordance with the load on the motor. When the load on the motor coupled to the pay-out reel is light, that is when the tape reel is almost empty, the speed of the motor increases. Since the amount of tape being wound or unwound on a relatively empty tape reel is small for each revolution of the tape reel, the speed of the tape reel is high so that the tape moves past the transducer heads at a desired speed.

The converse is true when the take-up reel is almost full. Since the load on the motor operatively coupled to the take-up reel is great, the speed of the motor is low. Because of the fact that each revolution of the tape reel supplies a large amount of tape, the speed of the motor is low to have the tape move at the desired speed past the transducer heads. The load on the motor and consequently the speed of the motor varies continuously but the movement of the tape is kept at the desired speed.

This invention also provides a simple method of instantaneously stopping the motion of the tape by using only one of the two motors in the tape system. This eliminates the need for precisely stopping both motors in the same period of time as discussed above. This portion of the invention also uses conditions which exist in the tape system to an advantageous result.

When the tape system is in operation, the motor connected to the pay-out reel is running in one direction while being energized in the opposite direction. This provides the necessary tension on the tape medium to eliminate slack in the tape medium. Since the motor is running in the opposite direction to that in which the motor is being energized, the back electromotive force in the motor has an opposite polarity to the voltage supplied to the motor. When the power to the motors in the tape system is disconnected to stop the movement of the tape medium, a circuit is completed through a diode to form a loop circuit and to supply current to the motor to have it operate in a direction opposite to the direction of tape travel. The tape system is now braked to stop the movement of the tape medium. The motor operatively coupled to the take-up reel is coasting with the discontinuation of power so that the braking action applied to the other motor quickly brings to a stop the motor coupled to the take-up reel.

In one form of the invention, the first diode is disconnected from the motor with the application of power to the motor, and in a second form of the invention the first diode is connected to the motor through a Zener diode with the application of power to the motor. If the motor tends to move the tape at a speed above the desired value, the back electromotive force produced in the windings of the motor breaks down the Zener diode to allow the Zener diode to provide a braking action as above. In the second form of the invention, the Zener diode is shorted upon the discontinuation of power to the motors and the circuit through the first diode and the motor becomes effective to provide maximum braking action.

Figure 1:
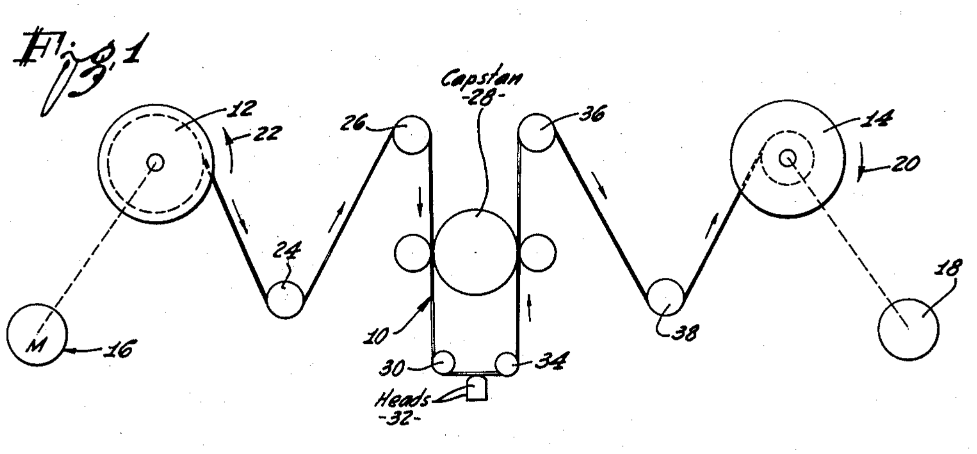
FIG. 1 is a view of a system for driving a medium such as tape between a pay-out reel and a take-up reel.

FIGURE 1 illustrates a tape drive system for driving an information medium such as a tape past transducer heads disposed between a pay-out reel and a take-up reel. It will be appreciated, however, that other tape drive systems may also be used. In the apparatus shown in FIGURE 1, the tape 10 is driven in a direction shown by arrows so as to be unwound from a pay-out reel 12 and become wound on a take-up reel 14. The pay-out reel 12 is driven by a motor 16 and the take-up reel 14 is driven by a motor 18. During recording and reproduction, the motor 18 drives the take-up reel 14 in a direction indicated by the arrow 20. The motor 16, however, is excited to drive the pay-out reel 12 in an opposite direction indicated by the arrow 22.

The force exerted by the motor 18 on the pay-out reel 12 is of a greater intensity than the force exerted by the motor 16. The motor 16, therefore, operates in a direction opposite from its direction of excitation. Since the motor 16 is energized in a direction opposite to its direction of rotation, it exerts a force on the tape to produce a tension throughout the tape medium. This prevents slack from being produced in the tape during the recording or reproduction of information and prevents breakage of the tape and inaccurate recording or reproduction of information on the tape medium.

The tape passes from the pay-out reel 12 over a guide roller 24. A guide roller 26 directs the tape through the capstan drive 28 in an essentially perpendicular relationship to the capstan drive. The tape makes a 90° turn over guide roller 30 and then moves past the heads 32. The roller 34 guides the tape back through the other side of the capstan drive 28 and over a guide roller 36. The tape is finally directed to the take-up reel 14 over an additional guide roller 38.

Figure 2:
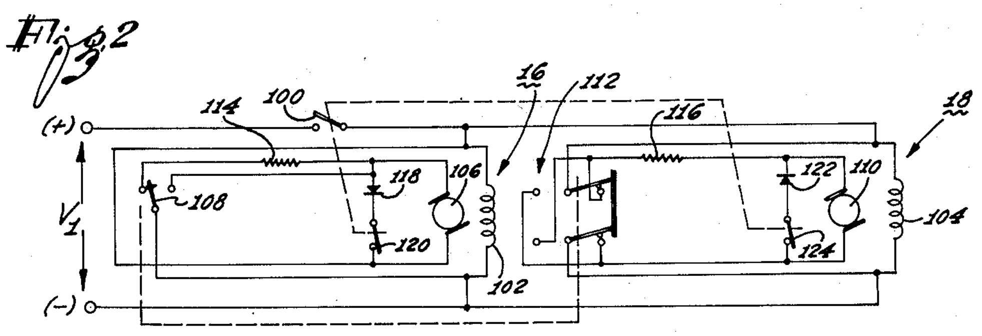
FIG. 2 is a schematic diagram of the circuitry included with the motors of FIGURE 1 to regulate the speed of the tape medium and to stop the motion of the tape.

FIGURE 2 is a schematic diagram of a circuit for accomplishing the purposes of this invention. The circuit regulates the speed of the tape medium and upon the discontinuation of power to the motors of the tape system the circuit stops the movement of the tape medium instantaneously. The circuit has a source $V_1$ of direct voltage connected through a switch 100 to the field windings 102 and 104 of the motors 16 and 18.

The armature winding 106 of the motor 16 is electrically coupled through a single-pole double-throw switch 108 to the source $V_1$. The armature winding 110 of the motor 18 is electrically disposed through a double-pole double-throw switch 112 to the power source $V_1$. When the switch 108 is in its lefthand position, a resistance 114 is connected in the armature winding circuit to reduce the current to the armature winding 106. When the switch 108 is in its righthand position, the resistance 114 is out of the circuit and the armature winding 106 receives full current.

When the switch 112 is in its righthand position, voltage of a first polarity from the source $V_1$ is applied across the armature winding 110 through a resitsance 116. In the lefthand position of the switch 112, voltage of an opposite polarity is applied through the resistance 116 to the armature winding 110. The switches 108 and 112 are ganged. The switch 108 is in its lefthand position when the switch 112 is in its righthand position and the switch 108 is in its righthand position when the switch 112 is in its lefthand position.

Coupled across the armature winding 106 is a series circuit of a diode 118 and a switch 120. Coupled across the armature winding 110 is a series circuit of a diode 122 and a switch 124. Switches 120 and 124 are ganged with the switch 100. When the switch 100 is closed, the switches 120 and 124 are open, and when the switch 100 is open the switches 120 and 124 are closed.

The plate of the diode 118 is connected to the negative terminal of the armature winding 106 and the cathode is connected through the switch 120 to the positive terminal of the armature winding 106. When the switch 112 is in its righthand position, the plate of the diode 122 is electrically disposed at the negative terminal of the armature winding 110 and the cathode of the diode 122 is coupled through the switch 124 to the positive terminal of the armature winding 110.

When the tape system is either recording or reproducing information on the tape medium, the switch 100 is in a closed position so that power from the source $V_1$ is applied to the armature windings and field windings of the motors 16 and 18. The switch 108 is in a lefthand position and the switch 112 is in a righthand position, as indicated in FIGURE 2. Power is applied to the motor 18 through the switch 112 such that the motor 18 rotates in a direction indicated by the arrow 20 illustrated in FIGURE 1. The power supplied to motor 16 is in an opposite direction, causing the motor to be excited to rotate in a direction indicated by the arrow 22 illustrated in FIGURE 1.

The resistance 114 has a greater value than the resistance 116. The power supplied to the motor 16 is therefore lower than the power supplied to the motor 18 and the motor 16 exerts a smaller force than the motor 18 on the tape drive system. This enables the motor 16 to be pulled by the motor 18 in a direction opposite to its direction of excitation.

The resistance 116 has a large value to convert the source $V_1$ to one of the constant current. Since the armature winding 110 is supplied with a constant current, the speed of the motor 18 varies inversely with the load on the motor. When the pay-out reel 14 is full, the load is great and the speed of the motor 18 is reduced. Similarly, when the pay-out reel 14 is almost empty, the load on the motor is reduced and the speed of the motor 18 is increased. Since the amount of tape wound on the take-up reel 14 is large when the take-up reel is full and small when the take-up reel is almost empty, it is desirable to have the motor 18 rotate at a variable speed to produce a constant speed of the tape past the heads 32. Maintaining the movement of the tape at a constant speed past the heads 32 is important in providing an accurate recording of information on the tape and an accurate reproduction from the tape of the information previously recorded on the tape.

When it is desired to stop the movement of the tape 10, the switch 100 is moved to its open position and power is discontinued to the motors 16 and 18. The switches 120 and 124 are now engaged and the diodes 118 and 122 are in circuit across the armature windings 106 and 110, respectively. The voltage remaining across the armature windings when the power is disconnected is a back electromotive force which is produced by the movement of the motors 16 and 18. The polarity of the back electromotive force is dependent upon the direction of rotation of the motors. The motor 18 rotates in a direction to produce a positive voltage at the cathode of the diode 122 and a negative voltage at the plate of diode 122. The diode 122 is therefore poled opposite to the polarity of the back electromative force and prevents any current from flowing in the loop circuit composed of the armature winding 110, the switch 124 and the diode 122. The motor 18, therefore, coasts until brought to a stop by the load on the motor.

The polarity of the back electromotive force produced by the motor 16 is opposite to the voltage applied to the motor 16. This results from the fact that the motor rotates in a direction opposite to its direction of excitation because of the superior force exerted by motor 18 on the tape. The back electromotive force of the motor 16 is therefore positive at the plate of the diode 118 and negative at the cathode of the diode 118. This causes the diode 118 to be conductive and a loop circuit to be formed through the armature winding 106, the diode 118 and the switch 120. The current flows in the loop circuit to cause the motor 16 to rotate in the direction indicated by arrow 22 illustrated in FIGURE 1. This is opposite to the direction of tape movement and causes a braking action to be applied to the tape. Because of this, the tape stops almost instantaneously.

When the switch 112 is in a lefthand position, the switch 108 is in a righthand position because of the ganged relationship of the switches. These positions of the switches 108 and 112 are used for a fast rewind function of the tape system. The resistance 114 is disconnected and a large current flows through the armature winding 106 so that the motor 16 rotates quickly in a direction indicated by the arrow 22. The switch 112 operates to reverse the polarity of the voltage across the armature winding 110 of the motor 18. The motor 18 rotates in the same direction as the arrow 22 to aid the action of the motor 16. When it is desired to stop the tape system as it operates in the fast rewind position, the power is discontinued by the opening of switch 100. The switches 120 and 124 are simultaneously closed since they are ganged to the switch 100.

The polarity of the back electromotive force produced across the armature winding 106 is positive at the cathode of diode 118 and negative at the plate of diode 118. The diode 118 is poled so that no current flows through the loop circuit including the armature winding 106, the diode 118 and the switch 120. The motor 16, therefore, coasts upon the discontinuation of power to the tape system while in the fast rewind position.

The polarity of the back electromotive force across the armature winding 110 is positive at the plate of the diode 122 and negative at the cathode. This causes current to flow in the loop circuit including the armature winding 110, the diode 118 and the switch 112. The motor is excited to operate in the direction indicated by the arrow 20 so as to brake the tape system to a stop almost instantaneously.

The diodes 118 and 122 operate to stop the tape system in either the forward or fast rewind position by the use of an electromotive force which is already present within the tape system. Only one motor is used at a time and it is not necessary to precisely match the stopping characteristics of the two motors.

Figure 3:
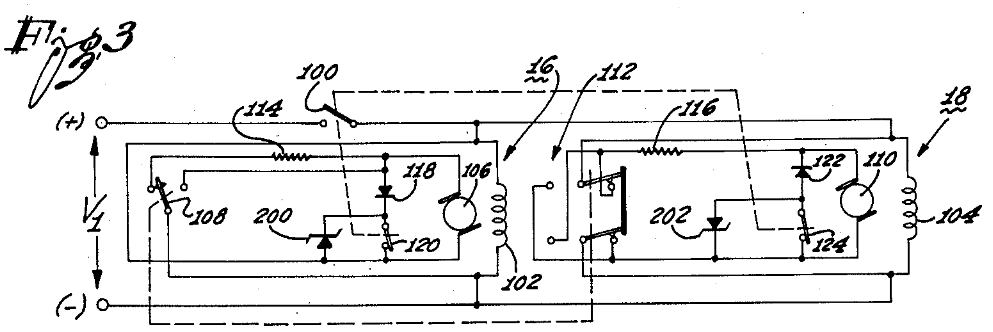
FIG. 3 is a second form of the invention similar to FIGURE 2 but including an additional Zener diode for regulation of the speed of the tape medium.

FIGURE 3 is an additional form of the invention wherein a Zener diode is connected in the armature winding circuits of both the motors 16 and 18. Like elements of FIGURE 3 are given the same numerals as in FIGURE 2 and perform the same functions. A Zener diode 200 is connected in series with, and in an opposite relation to, the diode 118 across the armature winding 106. In a similar fashion, a Zener diode 202 is connected in series with the diode 122 across the armature winding 110. The Zener diodes 200 and 202 are operative during the time that the switch 100 is closed and the switches 120 and 124 are open.

When the tape system is in a forward direction and the back electromotive force across the armature winding 106 is greater than a desired amount, the Zener diode 200 breaks down and conducts. A current flows in the loop circuit composed of the armature winding 106, the diode 118 and the Zener diode 200 in a direction to excite the motor 16 to oppose the direction of tape movement. This produces a braking action on the tape system to regulate the speed of the tape medium.

The tape system is in a reverse direction for fast rewind when the switch 108 is in a lefthand position and the switch 112 is in a righthand position. In these positions of the switches 108 and 112, the Zener diode 202 operates to prevent excessive tape speed. When the back electromotive force is larger than a desired amount, the Zener diode 202 breaks down and a loop circuit is formed through armature winding 110, the Zener diode 202 and the diode 122. A current flows through the loop circuit to excite the motor 18 to oppose the direction of tape movement and to regulate the tape speed.

When the tape system is in a forward direction, current does not flow in the loop circuit including the armature winding 110, the diode 122 and the Zener diode 202 even if the back electromotive force is sufficient to break down the Zener diode 202. The reason is that the diode 122 is poled non-conductive. The same is true when the tape system is in a fast rewind position since the Zener diode 200 is poled non-conductive.

The rest of the circuitry of FIGURE 3 operates in the same manner as FIGURE 2. The resistance 116 regulates the speed of motor 18 to control the tape movement at a constant value. When the power source $V_1$ is disconnected to stop the movement of the tape medium, switches 120 and 124 are closed to short out the Zener diodes 200 and 202. If the tape system operates in the forward direction, the current flowing in the loop circuit of the armature winding 106, the switch 120 and the diode 118 acts to induce a force in the motor 16 for braking the tape system to a quick stop. In the fast rewind position, the current flowing in the loop circuit of the armature winding 110, the diode 122 and the switch 124 has the same effect to brake the tape system to a quick stop.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a tape, first and second reels operatively coupled to the tape for driving the tape between the first and second reels, first and second motor means respectively coupled to the first and second reels for driving the first and second reels, means electrically coupled to the first and second motor means for energizing the first and second motor means for operation and for obtaining the production of a greater force by the first motor means than by the second motor means to obtain the movement of the tape from the second reel to the first reel, switch means having open and closed states and operatively coupled to the last mentioned means to be in the open state during the energizing of the first and second motor means and to be in the closed state upon an interruption in the energizing of the first and second motor means, and unidirectional means connected to the switch means and the second motor means in a direction to obtain a flow of current through the second motor means opposing the movement of the tape and quickly stopping the second motor means upon an interruption in the energizing of the second motor means.

2. The combination set forth in claim 1 in which, means are connected across the switch and are operative during the open state of the switch means and are responsive to speeds of the tape above a particular value to produce an increased current in the second motor means for opposing the movement of the tape.

3. In combination for use with a movable tape, a pay-out reel and a take-up reel operatively coupled to the tape for obtaining a movement of the tape between the pay-out reel and the take-up reel, first and second motor means operatively coupled to drive the pay-out and take-up reels respectively, each of the first and second motor means having an armature winding and a field winding, a source of direct voltage connected to the field windings of the first and second motor means to supply a voltage to the motor means, means electrically coupling the source of direct voltage to the armature winding of the first motor means for supplying voltage to the armature winding of a polarity and magnitude to produce a force of a first value on the first motor means for a rotation of the motor in a first direction, means electrically coupling the source of direct voltage to the armature winding of the second motor means for supplying voltage to the armature winding of a polarity and magnitude to produce on the second motor means a second force less than the first force for a rotation of the second motor means in a direction opposite to the first motor means, switch means having open and closed states of operation and being operatively coupled to the source of direct voltage and to the armature winding of the second motor means to operate in the open state upon the application of voltage from the source to the second motor means and to operate in the closed state upon an interruption in the application of voltage to the second motor means, and unidirectional means having conductive and non-conductive states and connected to the switch means to be shorted by the switch means in the closed state of the switch means and to provide a flow of current through the armature winding of the second motor means in a direction for quickly stopping the motor means upon the occurrence of an open state in the switch means.

4. In combination for use with a movable tape, a direct current motor having a field winding and an armature winding, a tape reel operatively coupled to the motor and having a central hub to support the tape and lateral sides extending from the central hub to contain the tape as it is wound or unwound from the tape reel with the tape reel constituting a load on the motor and the varying amounts of tape deposited on the tape reel changing the load to the motor, a source of direct voltage, a switch having first and second positions and connected in a circuit with the voltage source and the armature winding of the motor to supply direct voltage of one polarity to the armature winding during the operation of the switch in the first position and to supply direct voltage of an opposite polarity to the armature winding during the operation of the switch in the second position, and a resistance having a high value and connected in the circuit from the voltage source to the armature winding when the switch is in the first position to limit the current flowing from the direct voltage source to the armature winding to an essentially constant value for the production of a variable force by the motor on the reel in accordance with the amount of tape on the reel and for the movement of the tape at a substantially constant speed, the resistance being disconnected from the circuit when the switch is in the second position.

5. In combination for use with a movable tape, first and second reel means operatively coupled to the tape for respectively providing pay-out and take-up functions to control the movement of the tape, first and second motor means each having a winding operatively coupled to the first and second reels to control the respective driving relationship between the first and second motor means and the first and second reels to impart movement to the tape medium, means for supplying a direct voltage to the windings of the first and second motor means to produce forces in opposite directions on the armatures of the first and second motor means and for producing a greater force on the armature of the first motor means than on the armature of the second motor means for obtaining a rotation of the first and second motor means in opposite directions, and a Zener diode connected across the winding of the second motor means to increase the force produced in the second direction by the second motor means upon the occurrence of tape speeds above a particular value.

6. The combination set forth in claim 5 in which unidirectional means are connected in a circuit with the Zener diode means and the winding in the second motor means in a direction to produce a flow of current through the Zener diode means and the motor means upon the occurrence of tape speeds above the particular value and in which switch means having open and closed states of operation are connected across the Zener diode means and in which the switch means is operatively coupled to the direct current supply means to remain open during the flow of current from the supply means to the winding in the motor means and to become closed upon an interruption in the flow of current from the supply means to the winding in the motor means to produce a force for quickly stopping the motor.

7. The combination set forth in claim 5 in which a resistance having a high value is connected in the circuit from the direct voltage supply to the winding of the first motor means to limit the current flowing from the direct voltage supply to the winding of the first motor means to an essentially constant value for the production of a variable force by the first motor means on the first reel means in accordance with the amount of tape on the reel and for the movement of the tape at a substantially constant speed.

8. In combination for use with a movable tape, a pay-out reel and a take-up reel operatively coupled to the tape to obtain a movement of the tape between the pay-out reel and the take-up reel, first and second motor means each having a winding and operatively coupled to the first and second reels to drive the first and second reels to wind the tape medium on one reel while respectively unwinding the tape medium from the other reel, direct current means operatively coupled to the winding in the first and second motor means for supplying power to the windings of the first and second motor means to obtain a rotation of the first and second motor means in opposite directions, means operatively coupling the direct current means and the windings of the first and second motor means to obtain the production of a force by the first motor means of a greater intensity than the force produced by the first motor means to make the second motor means rotate in the same direction as the first motor means, first switch means having open and closed states of operation and operatively connected to the direct current supply means to connect the supply means in the first state of operation to the windings of the first and second motor means and to disconnect the supply means in the second state of operation from the windings of the first and second motor means, unidirectional means and a Zener diode connected across the winding of the second motor means, the unidirectional means being poled non-conductive for currents supplied by the direct current supply means, the Zener diode being poled in an opposite relation to the first diode means to become conductive and produce an increased flow of current through the unidirectional means and the winding of the second motor means and an increased force by the second motor means to oppose the movement of the tape upon an increase in the speed of the tape above a desired value, and second switch means having open and closed states of operation and connected across the second Zener diode means and operatively coupled to the first switch means to remain open during the closure of the first switch means and to become closed upon an opening of the first switch means for the flow of current through the unidirectional means and the winding of the second motor means in a direction to quickly stop the second motor means.

9. In combination for use with a tape, first and second reels operatively coupled to the tape for driving the tape between the first and second reels, first and second motor means respectively coupled to the first and second reels for driving the first and second reels, means electrically coupled to the first and second motor means for energizing the first and second motor means for operation and for obtaining the production of a greater force by the first motor means than by the second motor means to obtain the movement of the tape from the second reel to the first reel, switch means having open and closed states and operatively coupled to the last mentioned means to be in the open state during the energizing of the first and second motor means and to be in the closed state upon an interruption in the energizing of the first and second motor means, resistance means electrically coupled to the means energizing the first motor means and having a high value when the switch means is in the open state to limit the current flowing from the energizing means to the first motor means to an essentially constant value for the production of a variable force by the first motor means on the first reel means in accordance with the amount of tape on the reel and for the movement of the tape at a substantially constant speed, and means connected in an electrical circuit with the switch means and the second motor means to obtain a flow of current through the second motor means in a direction for quickly stopping the second motor means upon interruption in the energizing of the second motor means.

10. In combination for use with a tape, first and second reels operatively coupled to the tape for driving the tape between the first and second reels, first and second motor means respectively coupled to the first and second reels for driving the first and second reels, first switch means having first and second positions, means electrically coupled to the first and second motor means and to the first switch means for energizing the first and second motor means for operation and for obtaining the production of a greater force by the first motor means than by the second motor means when the first switch means is in the first position to obtain the movement of the tape from the second reel to the first reel and for energizing the first and second motor means for operation and for obtaining the production of a greater force by the second motor means than by the first motor means with the first switch means in the second position to obtain the movement of the tape from the first reel to the second reel, second and third switch means having open and closed states and operatively coupled to the last mentioned means to be in the open states during the energizing of the first and second motor means and to be in the closed states upon an interruption in the energizing of the first and second motor means, first unidirectional means connected to the second switch means and the second motor means in a direction to obtain the flow of current through the second motor means opposing the movement of the tape and quickly stopping the second motor means upon an interruption in the energizing of the second motor means when the movement of the tape is from the second reel to the first reel, and second unidirectional means connected to the third switch means and the first motor means in a direction to obtain a flow of current through the first motor means opposing the movement of the tape and quickly stopping the first motor means upon an interruption in the energizing of the first motor means when the movement of the tape is from the first reel to the second reel.

References Cited in the file of this patent

UNITED STATES PATENTS

| | | |
|---|---|---|
| Re. 23,312 | Dyer | Dec. 26, 1950 |
| 2,168,777 | McCreary | Aug. 8, 1939 |
| 2,397,557 | McCoy | Apr. 2, 1946 |
| 2,677,082 | Allbert et al. | Apr. 27, 1954 |
| 2,912,632 | Turtil | Nov. 10, 1959 |
| 3,045,937 | Johnson | July 24, 1962 |